//

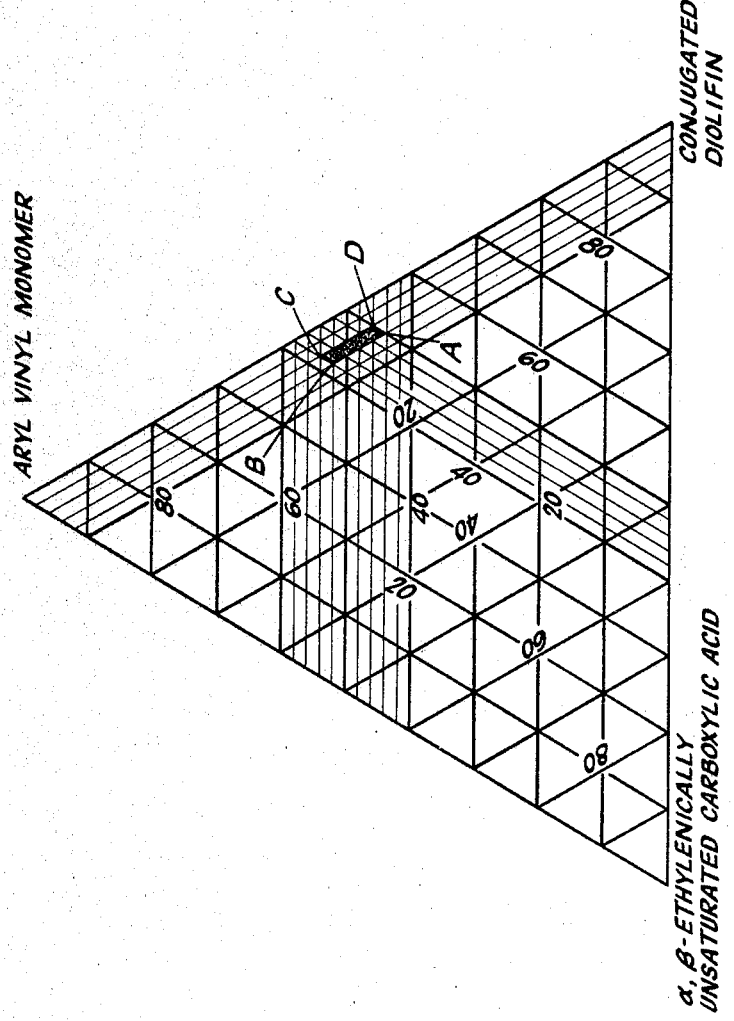

United States Patent Office 3,484,395
Patented Dec. 16, 1969

---

3,484,395
PAPER COATING LATEX PREPARED IN THE PRESENCE OF AN ALKYL PHENYL POLYPHOSPHATE ESTER SALT SURFACTANT
Leonard F. Guziak, Pittsburgh, Pa., assignor to Koppers Company, Inc., a corporation of Delaware
Filed Apr. 18, 1967, Ser. No. 631,670
Int. Cl. C08d 1/09, 7/00; D21h 3/64
U.S. Cl. 260—8                             8 Claims

ABSTRACT OF THE DISCLOSURE

A novel latex which, in a paper coating, exhibits exceptionally high wet rub and wet pick resistance is prepared by polymerizing a styrene-butadiene-acrylic acid terpolymer having a weight ratio of 44–54/42–50/4–6, in the presence of an alkali or ammonium salt of an alkylphenyl polyphosphate ester surfacant. The latex has an average particle size of 0.16–0.24 microns and exhibits enhanced resistance to oxidation and elevated temperatures.

BACKGROUND OF THE INVENTION

The addition of latices to a starch based paper coating plasticizes the coating to render the coating less brittle and reduces shrinking during drying of the coating. The latex addition also produces paper coatings with superior gloss and smoothness. It is necessary, however, in producing a useful latex-starch coating, that the coating possess bonding strength, flexibility, printability, gloss and wet rub and wet pick resistance. Wet rub resistance relates to the resistance of wet coating paper to the removal of the coating latex or pigments therein by abrasion or rubbing, while wet pick resistance refers to the resistance to removal of the latex or pigments therein by the pulling action of ink during high speed printing. These properties are essential for satisfactory printing of the coated paper.

Conventionally, paper coatings have contained oxidized starch as additional adhesive for the latex. Developments have now led to the use of enzyme-converted starch because of the better properties and lower cost connected therewith. In view of the transition to enzyme-converted starch, it is imperative that latices be compatible with the enzyme-converted starch as well as with conventional starches and casein.

SUMMARY OF THE INVENTION

It has been found that latices having high starch compatibility, for use in paper coatings, which coatings have high wet rub and wet pick resistance, can be prepared by the emusion polymerization technique in an aqueous system of 44–54 parts of an aryl vinyl monomer, 42–50 parts of a conjugated diolefin and 4–6 parts of an α,β-ethylenically unsaturated carboxylic acid to a terpolymer in the presence of 1.0–5.0 parts of a salt of an alkylphenyl polyphosphate ester surfactant.

BRIEF DESCRIPTION OF THE DRAWING

In the attached drawing, there is illustrated the proportions of the three monomers which may be combined to form the novel terpolymer latex, employing the process of this invention, useable in paper coating compositions exhibiting enhanced wet rub and wet pick resistance. These proportions of monomers are shown in the shaded area ABCD of the drawing.

DETAILED DESCRIPTION

Aryl vinyl monomers useable in the invention include styrene, vinyl toluene, α-methylstyrene, ethylstyrene, dimethylstyrene, divinyl-benzene, p-methoxystyrene, p-chlorostyrene, 2,4-dichlorostyrene, 2,5-dichlorostyrene, α-methyl-p-methylstyrene, vinyl naphthalene and the like. Mixtures of two or more such compounds may be used.

Conjugated diolefins useable include 1,3-butadiene, 2-methyl-butadiene-1,3(isoprene), 2-chlorobutadiene-1,3 (chloroprene), piperylene, 2,3-dimethylbutadiene and the like.

Examples of α,β-ethylenically unsaturated carboxylic acids useable in the invention are acrylic acid, methacrylic acid, ethacrylic acid, crotonic acid and the like.

These components are emulsion polymerized to form the novel terpolymers of the present invention. The polymerization is illustrated by example, using styrene 1,3-butadiene and acrylic acid, the preferred monomers. Accordingly, the remainder of the specification will refer to these monomers although the other described monomers may be substituted throughout if desired.

The relative weights of these three components in the latex is essential. These weights are illustrated in the attached drawing. If less than about 42 parts by weight of butadiene (line BC of attached drawing) is used, a severe drop in the pick resistance of the resultant coatings is obtained. If in excess of 50 parts by weight of butadiene (line AD of attached drawing) is used, the coating compositions also exhibit greatly decreased pick resistance. The presence of acrylic acid in the prescribed limits, 4–6 parts by weight, is also necessary to provide coatings having the exceptional wet pick and wet rub resistance. At lower concentrations, less than 4 parts (line CD of attached drawing) the latex shows decreased compatibility with enzyme-converted starch. In fact, at less than about two parts by weight of acrylic in the latex, almost 100 percent coagulum is evidenced. The lower acrylic acid content also gives greatly decreased pick resistance. If greater than about 6 parts acrylic acid (line AB of attached drawing) is used, the viscosity of the solution becomes too thick to be effectively used. The remainder of the terpolymer is comprised of styrene. There is thus 44–54 parts by weight of styrene in the latex. Deviation from this range 44 parts (locus A of attached drawing) to 54 parts (locus C of attached drawing) results in decreased pick resistance and rub resistance. The preferred composition, which has been found to have optimum properties, is in the order of 49/46/5; styrene/1,3-butadiene/acrylic acid.

The coating compositions of the invention are provided with the unexpected wet pick and wet rub resistance when prepared in the presence of 1.0–5.0 parts of an alkali salt of an alkylphenyl polyphosphate ester as a surfactant. The alkylphenyl phosphate esters are mixtures of those of the formula:

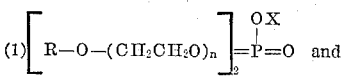 and

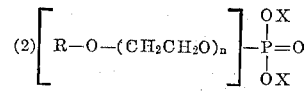

wherein X is ammonium or alkali metal and R is an alkylphenyl group wherein the alkyl group contains 8–20 carbon atoms; with Formula 2 present in a major amount. The necessary surfactant, an alkali or ammonium salt of an alkylphenyl polyphosphate ester is readily prepared from the alkylphenyl polyphosphate esters sold under the trademark GAFAC, registered to General Aniline and Film Corporation.

It is surprising that these particular surfactants cause an increase in wet rub and wet pick properties of latices produced in their presence. For example, substitute anionic surfactants as a series of biodegradable or non-biodegradable alkylbenzene sulfonates were used successfully to prepare latex products, for use in coatings, but all such latex coatings lacked the superior wet pick and wet rub resistance of the coatings of the present invention.

Not only does the use of the organic polyphosphate esters result in latices exhibiting enhanced wet rub and wet pick resistance, but the resistance of the latices to heat and to oxidation is increased. Thus, they serve as a heat stabilizer and as an antioxidant for color stability in coatings using the latices of this invention.

The latex is formed by polymerization of the three components, styrene-butadiene-acrylic acid, in the prescribed limits, by conventional aqueous emulsion polymerization processes. Preferably, water is charged to a reactor and there is dissolved therein the catalyst, emulsifying agents and dispersing agents. Conventional polymerization catalyst are useable, including potassium persulfate, benzoyl peroxide, lauroyl peroxide, di-tert-butyl peroxide and the like, or mixtures thereof. The amount of catalyst generally falls within the range of 0.01 to 1.0 part per one hundred parts of total monomers.

In addition to the alkylphenyl polyphosphate ester surfactants, conventional alkaline or neutral emulsifying agents alone or as mixtures may be used, such as: alkali metal salts of long chain alkyl sulfates and sulfonates; ethylene oxide condensates of long chain fatty acids, alcohols or mercaptans; sodium salts of sulfonated hydrocarbons; alkyl aryl sulfonates, and the like. Those emulsifying agents include, for example, sodium lauroyl sulfate, sulfosuccinic acid esters, etc.

The amount of water used in the emulsion polymerization may vary widely and is dependent on the desired solids content of the latex prepared. The latex preferably contains water sufficient to provide a solids content in the order of 45–60 percent.

The polymerization is carried out at a temperature conventionally used in polymerization, such as between 50 and 100° C., preferably at a temperature of 70–80° C.

The polymerization is carried out under acidic conditions. Upon completion of the polymerization, the pH of the latex is adjusted to 8–10, preferably about 9.5, with inorganic or organic bases such as sodium hydroxide, ammonium hydroxide, potassium hydroxide, morpholine, water soluble amines, hydroxyamines, and the like; ammonium hydroxide preferably being used.

By using the foregoing conditions of polymerization, the desired latex is produced as a terpolymer having an average particle size of 0.16–0.24 micron. The optimum average particle size for use in the paper coatings of the invention is in the order of 0.20–0.21 micron, but some deviation can be tolerated within the above-described limits, average particle sizes outside this range produce latices unsuitable for convenient coating processes.

Paper coating compositions prepared with certain clays have a tendency to increase in viscosity and dispersants may be added to this latex to control viscosity in the coating formulation. Such dispersants include polyphosphates or sodium salts of carboxylic polyelectrolytes or mixtures of these.

The coating compositions of the invention are prepared by admixing the foregoing novel latex with an adhesive and an inorganic pigment in an aqueous suspension. The adhesive may be oxidized starch, enzyme-converted starch or casein. The composition can contain large amounts of the starch, enzyme-converted starch or casein in relation to the amount of latex because of the high degree of compatability of the novel latex of the invention with such components. Compositions, for example, have been prepared with as much as ten parts by weight of starch to one part by weight of latex with excellent results in the coating of paper.

The inorganic pigments may be clay, calcium carbonate, titanium dioxide and the like or mixtures thereof, with suitable dispersants therefor.

The latices used in the present invention form paper coating compositions of increased wet pick resistance and wet rub resistance Pick resistance relates to the resistance to removal by the pulling action of ink during high-speed printing. The term is known in the art and is measured by the standard IGT test. In determining the wet pick resistance of paper coating latices, the IGT test is followed except that the coated paper is moistened with a controlled amount of water. The amount of water corresponds to the amount of moisture at the fifth stage of a five color off-set printing press.

Wet rub resistance was measured by the Taber Wet Rub Test. This conventional test is described as the Taber Wet Rub Test, TAPPI Routine Control Method No. 184, and is basically an abrasion test.

Example I

A five-gallon reactor equipped with stirrer and heating jacket was charged with 45 parts of water, agitation started, and the reactor was purged with nitrogen. To the stirred water was added 0.05 part of potassium persulfate, 0.20 part of potassium sulfate and 0.10 part of Sequestrene $Na_2$. Fifty-five parts of the potassium salt of an alkylphenyl polyphosphate ester as surfactant (prepared by adding 10% aqueous potassium hydroxide [ca. 266 mil] to a stirred solution of 240 grams GAFAC RE-610 in 2400 grams of water until a pH of 8.0 is reached. A stock solution of 8.4% solids is thus obtained), and 0.66 part of Aerosol OT (sodium sulfosuccinate) were added to the reactor, followed by 5.0 parts acrylic acid dissolved in 49.0 parts of styrene. There was also added 0.50 part of aqueous hydrochloric acid (one part conc. HCl to four parts water). Inhibitor-free butadiene, 46.0 parts was then charged to the reactor and the total charge heated with agitation, to 75° C. during 35 minutes and held at 75° C. for 12.5 hours. The resulting latex had a solids content of 47.8%, an average particle of 0.21 micron, and a slightly opaque white color. The pH was adjusted to 9.0 by addition of ammonium hydroxide. The viscosity of the latex was 510 cps. and it had a surface tension of 37 dynes/cm. The latex was compatible with enzyme starch in excess of a ratio of ten parts by weight of said starch to one part of latex.

Example II

Three coating compositions were prepared, at varying starch to latex ratios, using aliquots of the latex of Example I. They were:

| Composition A: | Parts by weight |
|---|---|
| Spray satin clay | 1200 |
| Calcium carbonate | 300 |
| Water | 345 |
| Calgon T | 3 |
| Enzyme starch, 30% solution | 800 |
| Latex | 125 |
| Total solids percent | 65 |
| Total adhesives percent | 20 |
| Starch/latex ratio | 4/1 |

Composition A had a Brookfield viscosity at 20 r.p.m. of 2800 centipoises.

| Composition B: | Parts by weight |
|---|---|
| Spray satin clay | 1200 |
| Calcium carbonate | 300 |
| Water | 405 |
| Calgon T | 3 |
| Enzyme starch, 30% solution | 667 |
| Latex | 208 |
| Total solids percent | 65 |
| Total adhesives percent | 20 |
| Starch/latex ratio | 2/1 |

Composition B had a Brookfield viscosity at 20 r.p.m. of 2800 centipoises.

| Composition C: | Parts by weight |
|---|---|
| Spray satin clay | 1200 |
| Calcium carbonate | 300 |
| Water | 455 |
| Calgon T | 3 |
| Enzyme starch 30% solution | 500 |
| Latex | 315 |
| Total solids _____percent__ | 65 |
| Total adhesives _____percent__ | 20 |
| Starch/latex ratio | 1/1 |

Composition C had a Brookfield viscosity at 20 r.p.m. of 2425 centipoises.

The three compositions (A–C) were used to coat paper using 12–14 pounds per ream coating weight and printing speeds of 250 and 450 ft. per minute and a 4 I.P.I. Tack-graded Ink. The resultant paper coatings are tested and the results listed in Table I.

Example VI

A latex prepared according to Example I was used to form latex-casein paper coating compositions. Three coating compositions were formed at varying casein to latex ratios using aliquots of the above-described resin. The compositions were:

| Composition G: | Parts by weight |
|---|---|
| Spray satin clay | 1200 |
| Calcium carbonate | 300 |
| Water | 560 |
| Calgon T | 3 |
| Casein, 20% solution | 960 |
| Latex | 100 |
| Total solids content _____percent__ | 56.5 |
| Total adhesion _____percent__ | 16 |
| Casein/latex ratio | 4/1 |

TABLE I

| Composition | Coat weight, lbs./ream 25″ x 38″, 500 | Wet pick, f.p.m., No. 4 Ink | Taber wet rub, 10 cycles, percent transmittance | Gloss 75° specular | Brightness | K and N Ink Brightness, percent | K and N Ink Retain, percent | IGT pick, f.p.m., No. 4 Ink |
|---|---|---|---|---|---|---|---|---|
| A | 13.0 | 140 | 24 | 66.5 | 75.5 | 56.2 | 74.5 | 315 |
| B | 16.4 | 145 | 83.5 | 66.0 | 75.5 | 56.5 | 74.8 | 335 |
| C | 16.0 | 177 | 98.5 | 66.5 | 75.5 | 57.5 | 76.2 | 350 |

It is thus evidenced that the latices prepared according to the invention show greatly increased wet pick and wet rub resistance while maintaining other desirable properties for paper coating latices.

Example III

A film of the latex of Example I was spread on a glass substrate. The film was exposed to an elevated temperature (170° C.) for a period of one hour. After the one-hour heating period, the film remained as a white, flexible resilient film. The latices formed according to the present invention are resistant to elevated temperatures even without the addition of antioxidants, an unusual property for latices containing up to five percent of acrylic acid.

Example IV

A latex was prepared generally according to the procedure of Example I except using two parts by weight of acrylic acid in place of the five parts by weight of acrylic acid used in Example I. Upon completion of the polymerization, 13 hours at 75° C., the latex was highly coagulated, with a lumpy, soft rubbery mass being present which was entirely unsuited for use in paper coating compositions.

Example V

A latex was prepared generally according to Example I except that the alkali salt of the alkylphenyl polyphosphate ester was omitted and an alkylbenzene sulfonate was used instead. The resultant latex showed reduced water resistance as a latex film and also very little heat stability. After one hour at 170° C. a film of the latex was dark brown and very brittle.

Composition G had a Brookfield viscosity at 20 r.p.m. (130° F.) of 5600 centipoises.

| Composition H: | Parts by weight |
|---|---|
| Spray satin clay | 1200 |
| Calcium carbonate | 300 |
| Water | 613 |
| Calgon T | 3 |
| Casein, 20% solution | 800 |
| Latex | 167 |
| Total solids _____percent__ | 56.5 |
| Total adhesive _____percent__ | 16.0 |
| Casein/latex ratio | 2/1 |

Composition H had a Brookfield viscosity at 20 r.p.m. (130° F.) of 4500 centipoises.

| Composition I: | Parts by weight |
|---|---|
| Spray satin clay | 1200 |
| Calcium carbonate | 300 |
| Water | 730 |
| Calgon T | 3 |
| Casein, 20% solution | 600 |
| Latex | 250 |
| Total solids _____percent__ | 56.1 |
| Total adhesive _____percent__ | 16.0 |
| Casein/latex ratio | 1/1 |

Composition I had a Brookfield viscosity at 20 r.p.m. (130 F.) of 1800 centipoises.

The three compositions were used to coat paper according to the procedure of Example II. The resultant paper coatings were tested and the results listed in Table II.

TABLE II

| Composition | Coat weight, lbs./ream 25″ x 38″, 500 | Wet pick, f.p.m., No. 4 Ink | Taber wet rub, 10 cycles, percent transmittance | Gloss 75° specular | Brightness | K and N Ink Brightness, percent | K and N Ink Retain, percent | IGT pick, f.p.m., No. 4 Ink |
|---|---|---|---|---|---|---|---|---|
| G | 11.6 | 127 | 76.7 | 53.5 | 76.5 | 54.8 | 71.7 | 340 |
| H | 8.4 | 144 | 89.7 | 51.2 | 76.0 | 58.7 | 56.7 | 298 |
| I | 9.2 | 103 | 92.1 | 57.2 | 76.5 | 56.5 | 55.1 | 250 |

Thus, also when employed with casein as additional adhesive, the compositions show greatly improved wet pick and wet rub resistance while maintaining comparable other properties of paper coating latices.

Example VII

A latex, prepared generally according to Example I, using methacrylic acid in place of acrylic acid also exhibits the increased wet rub and wet pick resistance evidenced in the coatings of Example II.

I claim:

1. A process for preparing a latex for use in a paper coating which exhibits enhanced wet rub and wet pick resistance, said latex having an average particle size of 0.16–0.24 micron, comprising emulsion polymerizing under acid conditions, a mixture of an aryl vinyl monomer, a conjugated diolefin and an $\alpha,\beta$-ethylenically unsaturated carboxylic acid in relative amounts as designated by the shaded area ABCD of the attached drawing, in the presence of 1.0–5.0 parts by weight, based on the weight of said mixture, of a salt selected from the group consisting of ammonium salts and alkali metal salts, of an alkylphenyl polyphosphate ester which alkyl group has 8–20 carbon atoms.

2. The process of claim 1 whereas said aryl vinyl monomer is styrene, said conjugated diolefin is 1,3-butadiene and said $\alpha,\beta$-ethylenically unsaturated carboxylic acid is acrylic acid.

3. The process of claim 2 wherein said styrene is present in 49 parts by weight, said 1,3-butadiene is present in 46 parts by weight and said acrylic acid is present in 5 parts by weight.

4. The latex prepared according to claim 1.

5. The latex of claim 4 in an aqueous suspension containing an adhesive selected from the group consisting of starch, enzyme-converted starch, oxidized starch, and casein, and an inorganic pigment selected from clay, calcium carbonate, titanium dioxide and mixtures thereof, as a paper coating composition characterized by enhanced wet pick and wet rub resistance.

6. In the emulsion polymerization of a monomeric mixture consisting essentially of 44–54 parts by weight of an aryl vinyl monomer, with correspondingly 42–50 parts by weight of a conjugated diolefin and 4–6 parts by weight of an $\alpha,\beta$-ethylenically unsaturated carboxylic acid in aqueous emulsion, the improvement comprising polymerizing in the presence of 1.0–5.0 parts by weight, based upon the total weight of said monomeric mixture, of a salt selected from the group consisting of ammonium salts and alkali metal salts, of an alkylphenyl polyphosphate ester which alkyl group has 8–20 carbon atoms.

7. The process of claim 6 wherein said aryl vinyl monomer is styrene, said conjugated diolefin is 1,3-butadiene and said $\alpha,\beta$-ethylenically unsaturated acid is acrylic acid.

8. The process of claim 7 wherein said $\alpha,\beta$-ethylenically unsaturated acid is methacrylic acid.

References Cited

FOREIGN PATENTS 1,481,042  4/1967  France.

HAROLD D. ANDERSON, Primary Examiner

E. WOODBERRY, Assistant Examiner

U.S. Cl. X.R.

117—155; 260—9, 29.7, 80.78